ized by the contraction of the bellows, it is discharged from a discharge check valve. By providing a fill member for eliminating a dead space in the pump chamber, the formation of air bubbles in the pump chamber is suppressed.

United States Patent [19]
Oshidari

[11] Patent Number: 5,772,413
[45] Date of Patent: Jun. 30, 1998

[54] BELLOWS TYPE PUMP

[75] Inventor: Toshikazu Oshidari, Yokosuka, Japan

[73] Assignee: Nissan Motor Co., Ltd., Kanagawa, Japan

[21] Appl. No.: 816,535

[22] Filed: Mar. 13, 1997

[30] Foreign Application Priority Data

Mar. 21, 1996 [JP] Japan ................................. 8-064641

[51] Int. Cl.⁶ .................................................. F04B 45/02
[52] U.S. Cl. ............................................................ 417/472
[58] Field of Search ..................................... 417/472, 473

[56] References Cited

U.S. PATENT DOCUMENTS

| 4,836,756 | 6/1989 | Fukumoto | 417/473 |
| 5,158,439 | 10/1992 | Fukumoto | 417/473 |

FOREIGN PATENT DOCUMENTS

| 2941830 A1 | 4/1981 | Germany | 417/472 |
| 4-187865 | 7/1992 | Japan . | |
| 509730 | 9/1976 | U.S.S.R. | 417/472 |
| 578487 | 10/1977 | U.S.S.R. | 417/472 |

Primary Examiner—Timothy Thorpe
Assistant Examiner—Peter G. Korytnyk
Attorney, Agent, or Firm—McDermott, Will & Emery

[57] ABSTRACT

A pump chamber for compressing a liquid such as engine fuel is formed inside a bellows, and the liquid is aspirated into the pump chamber from a suction check valve when the bellows elongates. After the liquid in the pump chamber is pressurized by the contraction of the bellows, it is discharged from a discharge check valve. By providing a fill member for eliminating a dead space in the pump chamber, the formation of air bubbles in the pump chamber is suppressed.

13 Claims, 7 Drawing Sheets

FIG. I

BELLOWS TYPE PUMP

FIELD OF THE INVENTION

This invention relates to a bellows type pump such as is used for supplying fuel to an engine.

BACKGROUND OF THE INVENTION

In a direct injection type engine wherein fuel is supplied to a cylinder via an injector facing the cylinder, a compact fuel pump is required which can deliver sufficient fuel injection pressure, such as is disclosed for example in Tokkai Hei 4-187865 published by the Japanese Patent Office in 1992.

This pump comprises a cylindrical bellows capable of elongating and contracting, and a pump chamber which is formed in a cavity inside this bellows.

A spring is also provided inside the bellows which presses the bellows in such a direction as to elongate it. A drive mechanism comprising a rotating cam at a movable end of the bellows contracts the bellows by pressing against the force of the spring, and thereby pressurizes fuel inside the pump chamber. A suction passage and discharge passage are respectively connected to the pump chamber via check valves. Fuel is aspirated into the pump chamber via the suction passage in a suction stroke when the bellows elongates, and is discharged from the chamber in a compression stroke when the bellows contracts.

In this bellows type fuel pump, the overall length of the bellows is set larger than the stroke length that is used for pumping so as to maintain the elasticity of the bellows at a suitable level. This increases the total capacity of the pump chamber, and the total fuel amount inside the pump chamber therefore largely exceeds the discharge amount.

When the pump rotation speed increases, numerous air bubbles are generated in the suction stroke, and expand into the pump chamber.

The pressure drop of the pump chamber in the suction stroke accordingly decreases, As a result, the fuel amount aspirated into the pump chamber is insufficient, and the pump discharge amount is also insufficient.

The pressure variation in the pump chamber accompanying contraction of the chamber is also damped due to the bubbles. As the cam rotation speed increases, pressure variations in the pump chamber are increasingly delayed due to the bubbles, and the timing with which the suction check valve closes is delayed. If the closing of the suction check valve overlaps with part of the compression stroke of the bellows, the pressure in the intake passage fluctuates and the suction amount of fuel to the pump chamber becomes unstable. The discharge pressure of the pump is adjusted by a high pressure regulator and the suction pressure of the pump is adjusted by a low pressure regulator, but as part of the discharged fuel is returned to the suction passage via a relief valve which is a part of the high pressure regulator, pressure variations in the suction passage also cause a pressure fluctuation of the high pressure regulator.

SUMMARY OF THE INVENTION

It is therefore an object of this invention to prevent air bubbles from forming inside the pressure chamber of a bellows type pump.

It is a further object of this invention to reduce pressure losses inside a bellows type pump.

In order to achieve the above objects, this invention provides a bellows type pump comprising a cylindrical bellows capable of elongating and contracting, a member for fixing the one end of the bellows, a mechanism for moving the other end of the bellows backwards and forwards in the direction of elongation and contraction, a pump chamber formed inside the bellows which expands and contracts with the elongation and contraction of the bellows, a suction passage for aspirating a liquid to the pump chamber, a suction check valve for preventing outflow of liquid from the pump chamber into the suction passage, a discharge passage for discharging the liquid in the pump chamber, a discharge check valve for preventing inflow of liquid to the pump chamber from the discharge passage, and a fill member for eliminating a dead space in the pump chamber, and wherein the fill member is fixed to the fixing member.

It is preferable that the pump chamber is formed between the fill member and the other end of the bellows, and a connecting passage which connects the suction check valve, discharge check valve and pump chamber is formed in the fill member.

In this case it is further preferable that the bellows type pump further comprises a suction port connecting the suction check valve with the connecting passage and a discharge port connecting the discharge check valve with the connecting passage, wherein the connecting passage comprises a notch formed in an end of the fill member which faces openings of the ports.

It is also preferable that the fixing member comprises an annular member which engages with the one end of the bellows, and the fill member is fixed to the fixing member by pressing the fill member into the annular member.

It is also preferable that the fixing member comprises an annular member which engages with the one end of the bellows and a member for supporting the annular member, the fill member comprises a flange at an end, and the fill member is fixed to the fixing member by gripping the flange between the annular member and the supporting member.

It is also preferable that either the suction check valve or the discharge check valve is disposed inside the fill member.

It is also preferable that the fill member comprises an elastic material which is filled inside the bellows while it is in a liquid state.

In this case it is further preferable that the fill member comprises a fluoride rubber. It is also preferable that the bellows is driven by a cam device which converts a rotation of an engine to an axial movement.

The details as well as other features and advantages of this invention are set forth in the remainder of the specification and are shown in the accompanying drawings.

DESCRIPTION OF THE PREFERRED EMBODIMENTS

Figure 1:
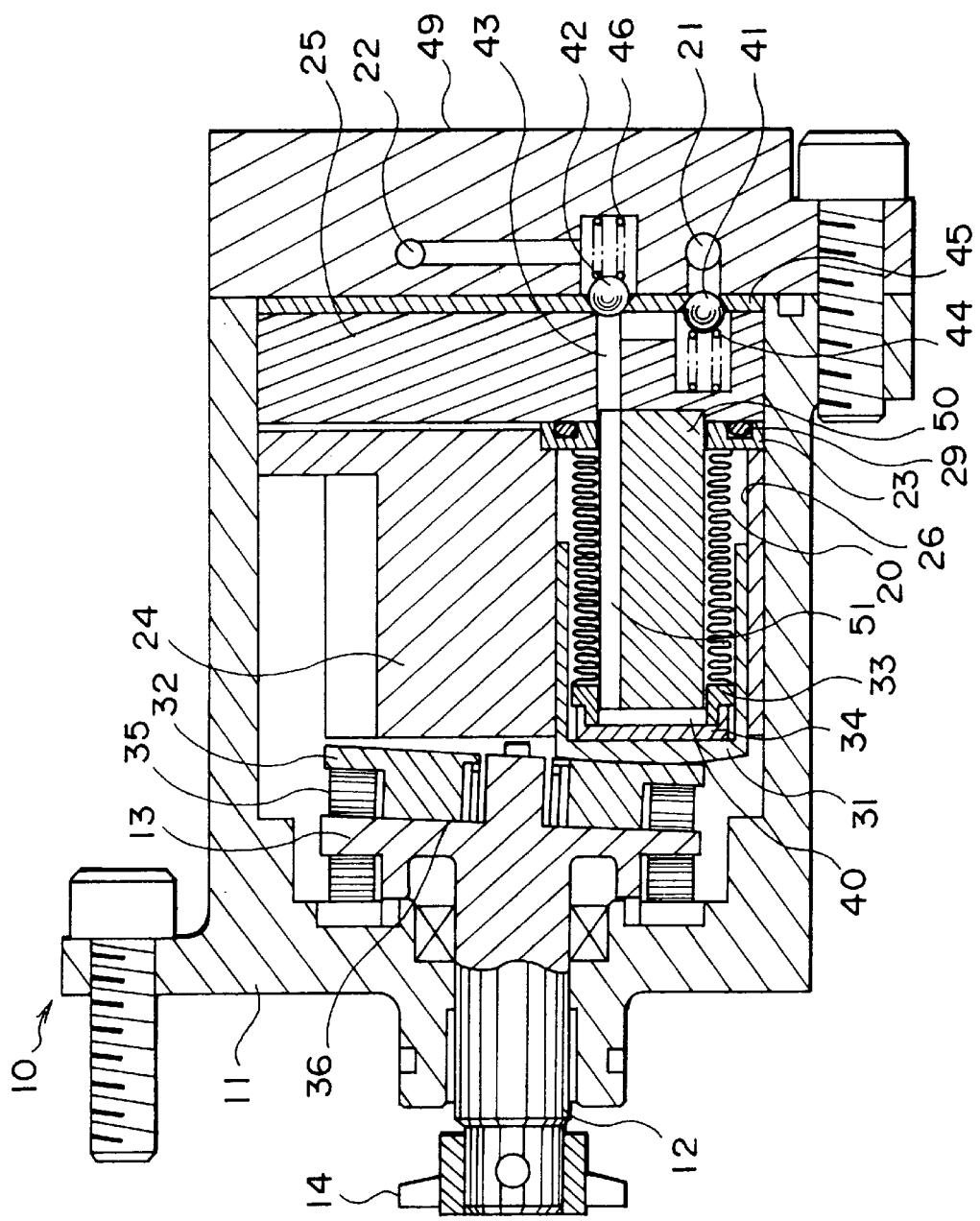
FIG. 1 is a vertical sectional view of a fuel pump according to a first embodiment of this invention.

Referring to FIG. 1 of the drawings, a bellows type fuel pump 10 for a direct injection spark ignition engine supplies fuel to fuel injection valves which are displaced to inject fuel to respective engine cylinders.

The fuel pump 10 comprises a pump housing 11 joined to a cylinder head, not shown, of the engine, a pump shaft 12 supported free to rotate in the pump housing 11, an axial cam 13 formed in a one-piece construction with the pump shaft 12, and a plurality of bellows 20 which move back and forth in synchronism with the axial cam 13. A key 14 is provided at one end of the pump shaft 12, and as this key 14 is coaxially engaged with a cutout formed at one end of the cam shaft, not shown, of the engine, the pump shaft 12 rotates together with the cam shaft.

The axial cam 13 has a cam surface inclined with respect to a plane perpendicular to the pump shaft 12, and comprises a center axis perpendicular to this inclined cam surface at its center. A swash plate 32 is supported by this cam surface via a thrust bearing 35 and by the center axis via a radial bearing 36.

A block 24 is fixed inside the pump housing 11 relative to the swash plate 32, and another block 25 is fixed in the pump housing 11 adjacent to the block 24.

A plurality of cylinders 26 are formed parallel to the pump shaft 12 inside the block 24, and a bellows 20 is provided in each of the cylinders 26. The bellows 20 is a cylindrically-shaped elastic member having a vertical section folded over in numerous layers.

It is pushed in the elongating direction by its own elasticity, and contracts when it is subject to a compressive force in the axial direction in the opposite sense.

One end of the bellows 20 is joined to an annular fixing member 23. This annular member 23 is gripped between the blocks 24 and 25 so that the end of the bellows 20 is fixed to the block 25.

The other end of the bellows 20 is sealed by an annular member 33 and cover 34. This annular member 33, cover 34 and part of the bellows 20 are inserted in a cylindrical bellows guide 31 having a base.

The bellows guide 31 engages such that it is free to slide on the inner circumference of the aforesaid cylinder 26. The bellows guide 31 projects outside the cylinder 26 due to the elasticity of the bellows 20, and its base surface is in contact with the swash plate 32.

Hence when the pump shaft 12 and axial cam 13 rotate together, the swash plate 32 supported by the axial cam 13 via the thrust bearing 35 and radial bearing 36 swings around without rotating, and the bellows 20 periodically contracts via the bellows guide 31. A radial cam having a rotation axis perpendicular to the center axis of the bellows 20 may be provided instead of the axial cam 13.

The housing 11 is sealed by a cover 49 on the outside of the block 25.

A port 43 connected to the pump chamber 40 is formed in the block 25. The port 43 connects with a suction passage 21 formed in the cover 49 via a suction check valve 41, and it is also connected to a discharge passage 22 formed in the cover 49 via an discharge check valve 42. These check valves 41 and 42 are pushed by springs 44 and 46, and seal the port 43 when they are respectively seated in valve seats 45 gripped between the block 25 and cover 49.

The fuel pump 10 aspirates fuel into the pump chamber 40 from the suction passage 21 via the inlet check valve 41 according to the elongation of the bellows 20. When the bellows 20 contracts, the fuel is pressurized, and is discharged to the discharge passage 22 via the discharge check valve 42.

Fuel in the suction passage 21 is adjusted to constant pressure by a low pressure regulator, not shown, and fuel in the discharge passage 22 is adjusted to constant pressure by a high pressure regulator, not shown.

A seal ring 29 is interposed between the block 25 and annular member 23 so that fuel does not leak from the pump chamber 40 into the housing 11.

However the contracting length of the bellows 20, i.e. the length difference between the extended length and contracted length of the bellows, is shorter than their overall length, so only part of the fuel in the pump chamber 40 is discharged from the discharge passage 42. A considerable volume of fuel therefore remains in the pump chamber 40 even when the bellows are contracted.

According to this invention, a fill member 50 is provided in the dead space of the bellows 20 to reduce this residual fuel amount. The fill member 50 is a material of high bulk elastic modulus.

The fill member 50 is formed in the shape of a circular column of which the outer diameter is slightly smaller than the inner diameter of the bellows 20. One end of the fill member 50 is pressed into the annular member 23 so as to penetrate it. One end of the fill member 50 is thereby fixed to the fixed end of the bellows 20.

The fill member 50 is made as long as is possible to the extent that the cover 34 does not come in contact with the fill member 50 when the bellows 20 is most contracted.

A gap formed between the cover 34 and the fill member 50 is the actual pump chamber 40 as shown in FIG. 1.

A connecting passage 51 connecting the pump chamber 40 and port 43 is formed in the fill member 50. This connecting passage 51 is a groove 57 in the outer circumferential surface of the fill member 50, as shown in FIG. 2.

Figure 2:
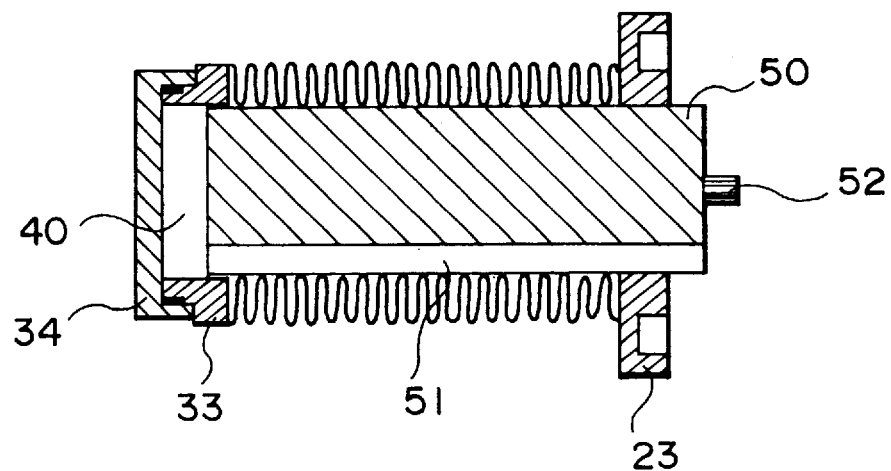
FIG. 2 is a vertical sectional view of a bellows and a fill member used in the fuel pump.
Figure 3:
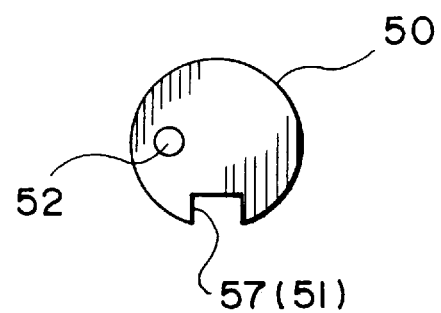
FIG. 3 is a front view of the fill member.

A knock pin 52 projects from one end of the fill member 50 as shown in FIGS. 2 and 3. A positioning hole, not shown, which engages with the knock pin 52, is formed in the block 25.

The knock pin 52 and positioning hole are offset with respect to the center of the fill member 50. Positioning of the fill member 50 in the rotation direction is achieved by the engaging of the knock pin 52 with the block 25 so that the connecting passage 51 and port 43 are connected.

By providing the fill member 50 to fill dead space in the bellows 20 in this way, the sum of the volume changes of the pump chamber 40 increases relative to the total volume of the pump chamber 40.

Consequently the amount of fuel in the pump chamber 40 decreases, so the amount of bubbles produced in the fuel in the pump chamber during the suction stroke when the bellows 20 elongates, decreases.

As the amount of air bubbles in the pump chamber 40 is reduced, the pressure drop in the chamber 40 due to elongation of the bellows 20 also increases.

The fuel amount aspirated into the pump chamber 40 via the suction check valve 41 is therefore sufficient, and the predetermined pump discharge amount is obtained.

Due to the lesser amount of air bubbles, the pressure variation delay in the pump chamber 40 when the bellows 20 elongate and contract is less, so the timing with which the suction check valve 41 closes is maintained within a suitable range even when the pump rotation speed increases. Therefore, pressure variations in the suction passage 21 tend to occur less.

As the connecting passage 51 is connected with the port 43, fuel flows smoothly between the pump chamber 40 and port 43, and pressure losses in the fuel pump 1 are also suppressed.

Figure 4:
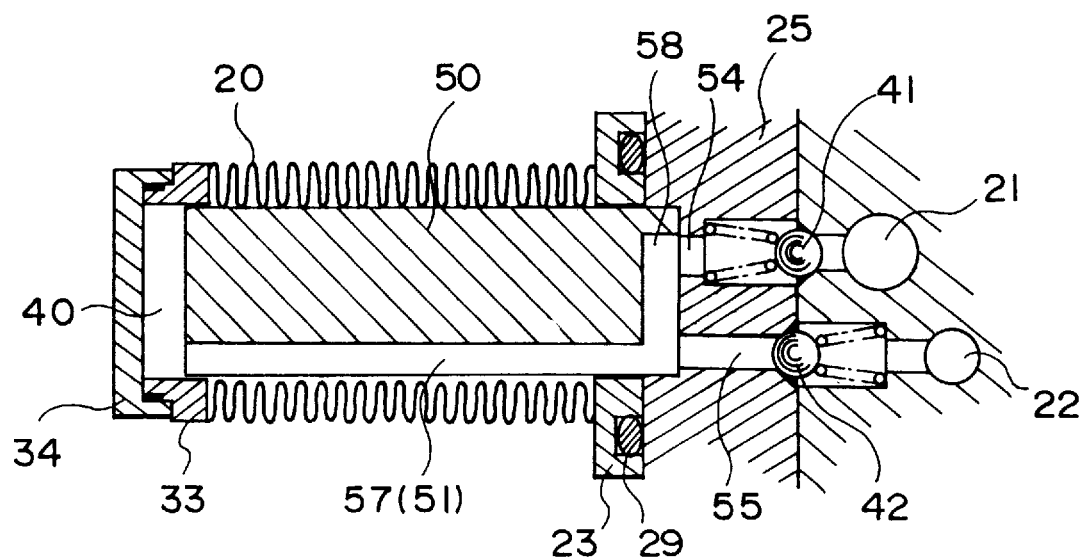
FIG. 4 is a vertical sectional view of a bellows and a fill member according to a second embodiment of this invention.
Figure 5:
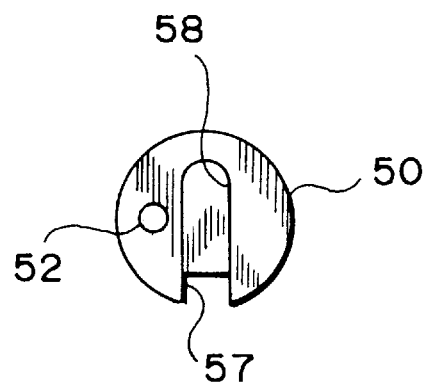
FIG. 5 is a front view of the fill member according to the second embodiment.

FIGS. 4 and 5 show a second embodiment of this invention.

According to this embodiment, the connecting passage 51 has an L-shaped vertical section formed by the groove 57 in the outer circumferential surface of the fill member 50 and the groove 58 in the end face of the fill member 50. A suction port 54 and discharge port 55 are respectively formed in the block 25. The suction port 54 and discharge port 55 both open out onto the groove 58. The suction port 54 is connected to the suction passage 21 via the suction check valve 41, and the discharge port 55 is connected to the discharge passage 22 via the discharge check valve 42.

The knock pin 52 is installed away from the groove 58. According to this embodiment, the suction port 54 and discharge port 55 are independent from one another, so the pressure loss in the fuel pump 10 can be further reduced.

Figure 6:
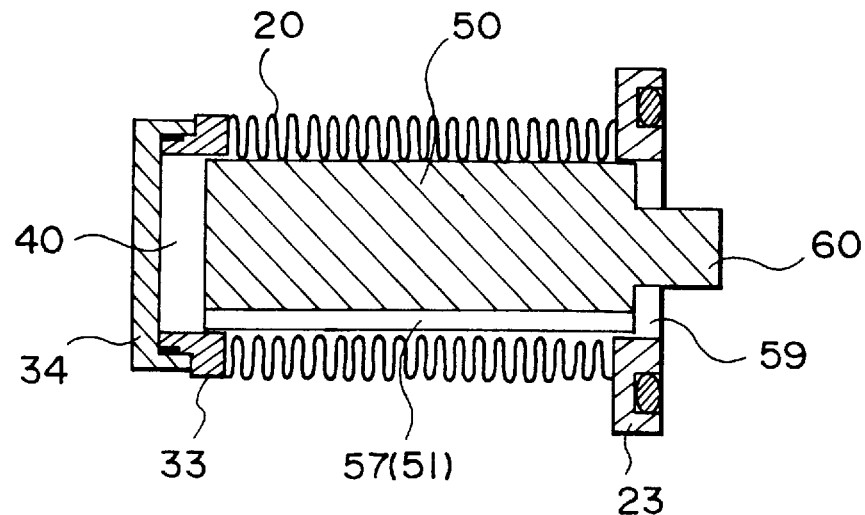
FIG. 6 is a vertical sectional view of a bellows and a fill member according to a third embodiment of this invention.

FIG. 6 shows a third embodiment of this invention.

The fill member 50 according to this embodiment has a center projection 60 which projects in an axial direction from the end face. An annular gap 59 connected to the groove 57 is formed around the center projection 60. The connecting passage 51 is formed by this annular gap 59 and the groove 57 in the outer circumferential surface of the fill member 50.

The center projection 60 is pressed into a hollow, not shown, provided in the block 25 of the aforesaid first and second embodiments. One end of the fill member 50 is thereby fixed to the block 25. A suction port and discharge port similar to those of the second embodiment are also formed near the annular gap 59.

According also to this embodiment, the suction port and discharge port are independent so pressure losses in the fuel pump may be considerably suppressed.

Figure 7:
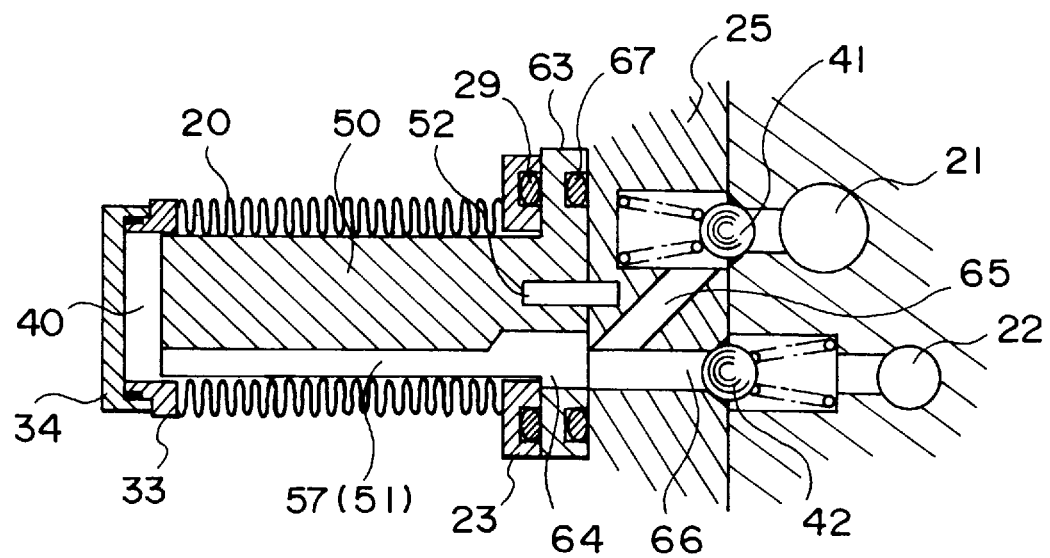
FIG. 7 is a vertical sectional view of a bellows and a fill member according to a fourth embodiment of this invention.
Figure 8:
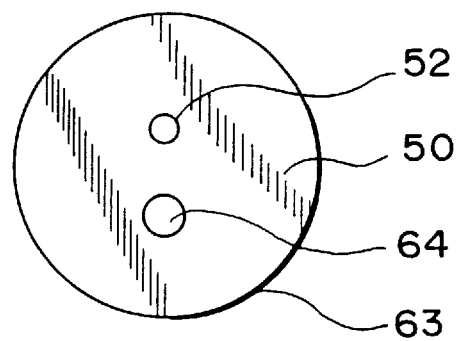
FIG. 8 is a front view of the fill member according to the fourth embodiment.

FIGS. 7 and 8 show a fourth embodiment of this invention.

According to this embodiment, the fill member 50 comprises a flange 63. The flange 63 is gripped by the annular member 26 and block 25 so that one end of the fill member 50 is fixed to the block.

The connecting passage 51 is formed from the groove 57 in the outer circumferential surface of the fill member 50, and a hole 64 in the base surface of the fill member 50. A seal ring 67 is interposed between the flange 63 and block 25. A suction port 66 and discharge port 65 are formed in the block 25 so that they connect with the hole 64.

The knock pin 52 is disposed such that it does not overlap with the center of the fill member 50, and such that it is situated away from the hole 64.

According to this embodiment, positioning in an axial direction of the fill member 50 is performed via the flange 63, so assembly precision of the fill member is enhanced.

Figure 9:
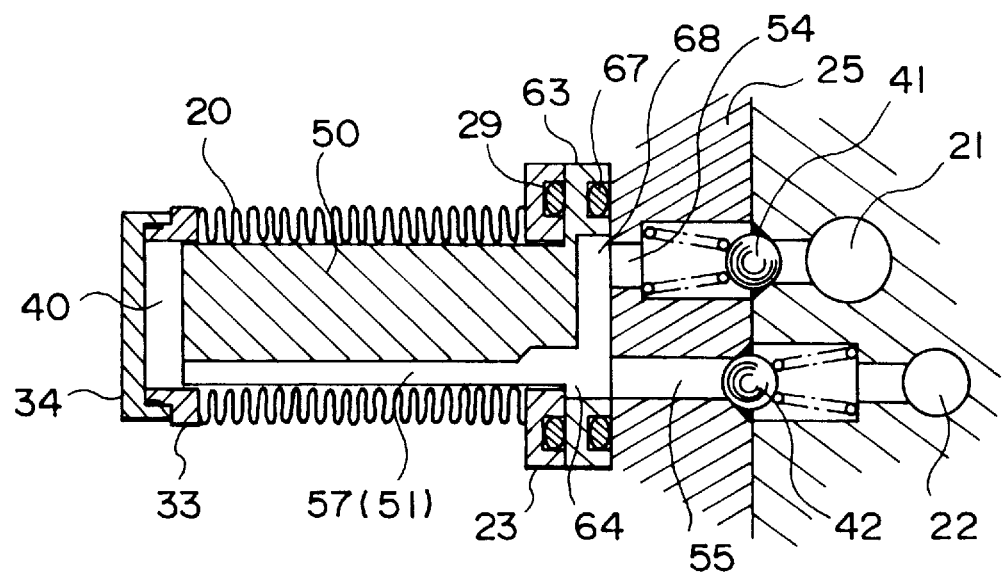
FIG. 9 is a vertical sectional view of a bellows and a fill member according to a fifth embodiment of this invention.
Figure 10:
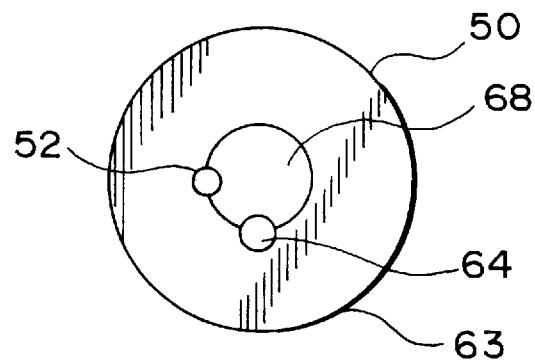
FIG. 10 is a front view of the fill member according to the fifth embodiment.

FIGS. 9 and 10 show a fifth embodiment of this invention.

The fill member 50 according to this embodiment comprises the same flange 63 as in the fourth embodiment.

The connecting passage 51 comprises the groove 57 in the outer circumferential surface of the fill member 50, the hole 64 in the base surface of the fill member 50, and a hollow 68 formed in a disk shape in the base surface of the fill member 50. A suction port 54 and discharge port 55 are formed in the block 25 as in the case of the second embodiment. The suction port 54 and discharge port 55 both open out onto the hollow 68. Part of the knock pin 52 projects into the hollow 68.

According to this embodiment, due to the hollow 68, the suction port 54 and discharge port 55 can be made to open into the hollow 68 separately so that pressure losses in the fuel pump are suppressed to a low level.

Figure 11:
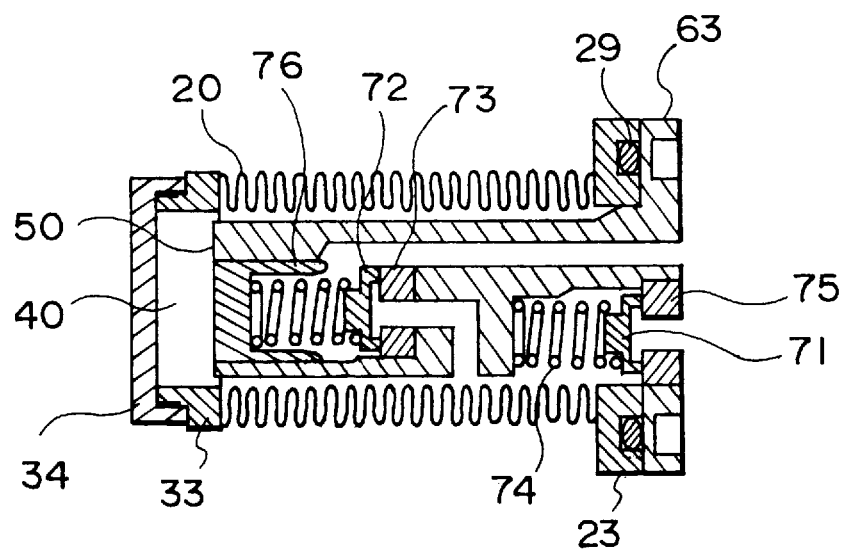
FIG. 11 is a vertical sectional view of a bellows and a fill member according to a sixth embodiment of this invention.

FIG. 11 shows a sixth embodiment of this invention.

The fill member 50 comprises the flange 63 at one of its ends. The flange 63 is gripped between the annular member 23 and the same type of block as the block 25 of the fifth embodiment. A suction check valve 71 and discharge check valve 72 are provided in the fill member 50. The suction check valve 71 is seated in a valve seat 75 due to the spring force of a spring 74, and allows flow of fuel only from the suction passage in the block to the pump chamber 40.

The discharge check valve 72 is seated in the valve seat 73 due to the spring force of a spring 76, and allows flow of fuel only from the pump chamber 40 to the discharge passage.

According to this embodiment, the inlet check valve 71 and outlet check valve 72 may be supplied as a unit together with the bellows 20 in the fill member 50. As there is no need to provide a check valve in the block or cover, it is unnecessary to machine these parts.

Figure 12:
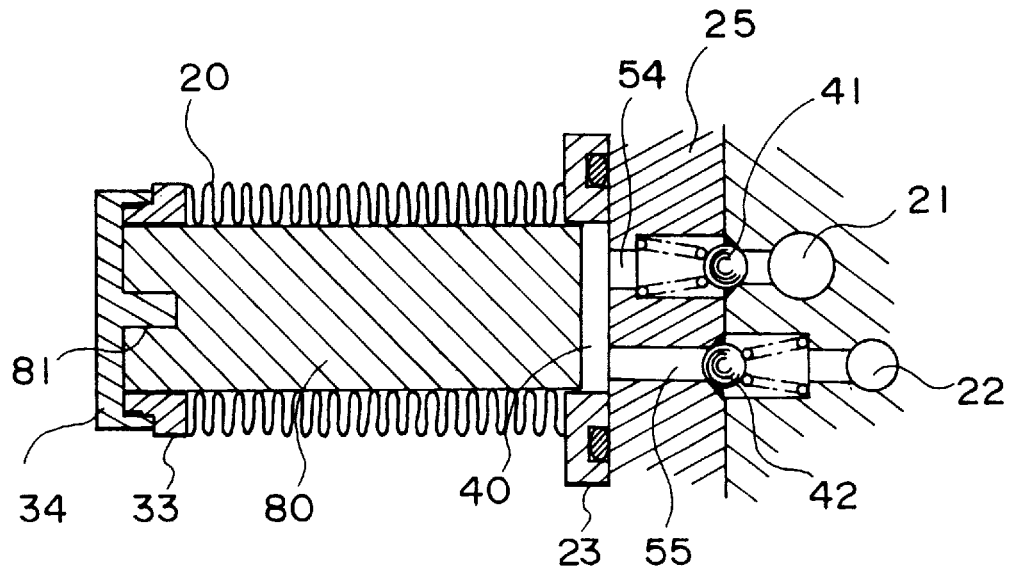
FIG. 12 is a vertical sectional view of a bellows and a fill member according to a seventh embodiment of this invention.

FIG. 12 shows a seventh embodiment according to this invention.

According to this embodiment, a fill member 80 fixed to the cover 34 is provided without fixing to the block 25.

The fill member 80 is formed in the shape of a cylinder having an outer diameter slightly less than the inner diameter of the bellows 20. An engaging hole is formed in the fill member 80 and the end face, and a projection 81 is formed which engages with the engaging hole in the cover 34. One end of the fill member 80 is pressed into the inner circumference of the annular member 33 so that this projection 81 engages with the engaging hole. One end of the fill member 80 is thereby fixed to the movable end of the bellows 20 via the annular member 33, and it moves together with the movable end of the bellows 20, i.e. together with the cover 34.

The length of the fill member 80 is arranged to be slightly less than the distance between the block 25 and the cover 34 when the bellows 20 is most contracted. The gap between the block 25 and one end of the fill member 80 forms the pump chamber 40. The suction port 54 and discharge port 55 are separately formed in the block 25, and they both open out into the pump chamber 40. The suction port 54 is connected to the suction passage 21 via the suction check valve 41, and the discharge port 55 is connected to the discharge passage 22 via the discharge check valve 42.

According to this embodiment, as the pump chamber 40 is formed by the block 25, there is no need to form a connecting passage in the fill member as in the aforesaid first to sixth embodiments, and pressure losses in the fuel pump are therefore reduced by a corresponding amount. Further, the suction port 54 and discharge port 55 can be separately provided without forming a groove or hollow in the fill member.

Figure 13:
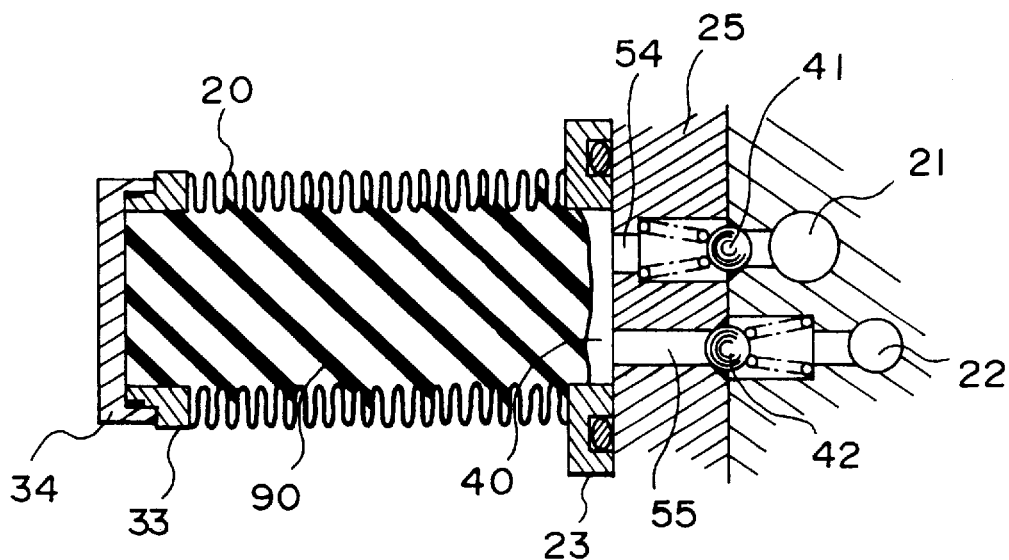
FIG. 13 is a vertical sectional view of a bellows and a fill member according to an eighth embodiment of this invention.

FIG. 13 shows an eighth embodiment of this invention.

According to this embodiment, the interior of the bellows 20 is first filled with fluoride rubber or the like to act as a fill member 90. However this member 90 may also be a material which is a liquid during filling, which functions as an elastic material after solidifying, and which is not deteriorated by gasoline. The solidified fill member 90 elongates and contracts together with the bellows 20. The fill member 90 is filled from the fixed end of the bellows 20. The filling amount of the fluoride rubber is determined according to the capacity of the pump chamber 40 formed between the block 25 and fill member 90.

The suction port 54, discharge port 55 and check valves 41, 42 have an identical construction to that of the aforesaid seventh embodiment. According to this embodiment, it is unnecessary to press the fill member 90 in or position it.

The embodiments of this invention in which an exclusive property or privilege is claimed are defined as follows:

1. A bellows type pump comprising:
   a cylindrical bellows capable of elongating and contracting,
   a fixing member to which one end of said bellows is connected,
   a mechanism for moving the other end of said bellows backwards and forwards with respect to said fixing member in the direction of elongation and contraction,
   a pump chamber formed inside the bellows which expands and contracts with the elongation and contraction of said bellows,
   a suction passage for aspirating a liquid to the pump chamber,
   a suction check valve for preventing outflow of liquid from said pump chamber into said suction passage,
   a discharge check valve for preventing inflow of liquid to said pump chamber form said discharge passage, and
   a fill member for eliminating a dead space in said pump chamber, wherein said fill member is fixed to the fixing member.

2. A bellows type pump as defined in claim 1, wherein said bellows type pump is driven by a cam.

3. A bellows type pump as defined in claim 1, wherein said bellows is driven by a cam device which converts a rotation of an engine to reciprocal movement of said bellows.

4. A bellows type pump as defined in claim 1, wherein said fill member is essentially cylindrical and is connected to said fixing member by a pin, said pin being eccentric with respect to the essentially cylindrical fill member and such to locate the fill member in a predetermined position within said bellows.

5. A bellows type pump as defined in claim 1, wherein said fill member is made of a material having a high bulk elastic modulus.

6. A bellows type pump comprising:
   a cylindrical bellows capable of elongating and contracting,
   a fixing member to which one end of said bellows is connected,
   a mechanism for moving the other end of said bellows backwards and forwards in the direction of elongation and contraction,
   a pump chamber formed inside the bellows which expands and contracts with the elongation and contraction of said bellows,
   a suction passage for aspirating a liquid to the pump chamber,
   a suction check valve for preventing outflow of liquid from said pump chamber into said suction passage,
   a discharge check valve for preventing inflow of liquid to said pump chamber from said discharge passage, and
   a fill member for eliminating a dead space in said pump chamber,
   wherein said fill member is fixed to the fixing member, said pump chamber is formed between said fill member and the other end of said bellows, and a connecting passage which connects said suction check valve, discharge check valve and pump chamber is formed in said fill member.

7. A bellows type pump as defined in claim 6, further comprising a suction port connecting said suction check valve with said connecting passage and a discharge port connecting said discharge check valve with said connecting passage, wherein said connecting passage comprises a notch formed in an end of said fill member which faces openings of said ports.

8. A bellows type pump as defined in claim 6, wherein said fixing member comprises an annular member which engages with the one end of said bellows, and said fill member is fixed to said fixing member by pressing said fill member into said annular member.

9. A bellows type pump as defined in claim 6, wherein said fixing member comprises an annular member which engages with the one end of said bellows and a member for supporting said annular member, said fill member comprises a flange at an end, and said fill member is fixed to said fixing member by gripping said flange between said annular member and said supporting member.

10. A bellows type pump comprising:
    a cylindrical bellows capable of elongating and contracting,
    a fixing member to which one end of said bellows is connected,
    a mechanism for moving the other end of said bellows backwards and forwards in the direction of elongation and contraction,
    a pump chamber formed inside the bellows which expands and contracts with the elongation and contraction of said bellows,
    a suction passage for aspirating a liquid to the pump chamber,
    a suction check valve for preventing outflow of liquid from said pump chamber into said suction passage,
    a discharge check valve for preventing inflow of liquid to said pump chamber from said discharge passage, and
    a fill member for eliminating a dead space in said pump chamber,
    wherein one of said suction check valve and said discharge check valve is disposed inside said fill member.

11. A bellows type pump comprising:

a cylindrical bellows capable of elongating and contracting, a fixing member to which one end of said bellows is connected, a mechanism for moving the other end of said bellows backwards and forwards in the direction of elongation and contraction, a pump chamber formed inside the bellows which expands and contracts with the elongation and contraction of said bellows, a suction passage for aspirating a liquid to the pump chamber, a suction check valve for preventing outflow of liquid from said pump chamber into said suction passage, a discharge check valve for preventing inflow of liquid to said pump chamber from said discharge passage, and a fill member for eliminating a dead space in said pump chamber, wherein said fill member is formed of a material which is made of one of a material of high bulk elastic modulus and rubber fixed to the other end of said bellows, and said pump chamber is formed between said fill member and said fixing member.

12. A bellows type pump comprising:

a cylindrical bellows capable of elongating and contracting, a fixing member to which one end of said bellows is connected, a mechanism for moving the other end of said bellows backwards and forwards in the direction of elongation and contraction, a pump chamber formed inside the bellows which expands and contracts with the elongation and contraction of said bellows, a suction passage for aspirating a liquid to the pump chamber, a suction check valve for preventing outflow of liquid from said pump chamber into said suction passage, a discharge check valve for preventing inflow of liquid to said pump chamber from said discharge passage, and a fill member for eliminating a dead space in said pump chamber, wherein said fill member comprises an elastic material which is filled into said bellows while it is in a liquid state.

13. A bellows type pump as defined in claim 12, wherein said fill member comprises a fluoride rubber.

* * * * *